United States Patent [19]

Yuasa et al.

[11] Patent Number: 4,482,978
[45] Date of Patent: Nov. 13, 1984

[54] KEY SWITCH INPUT CONTROL CIRCUIT

[75] Inventors: Yoshio Yuasa, Kawachinagano; Kazuhiko Naruse; Nobukazu Kawagoe, both of Sakai, all of Japan

[73] Assignee: Minolta Camera Kabushiki Kaisha, Osaka, Japan

[21] Appl. No.: 296,144

[22] Filed: Aug. 25, 1981

[30] Foreign Application Priority Data

Aug. 29, 1980 [JP] Japan .................. 55-123291[U]

[51] Int. Cl.³ .................................. G06F 3/02
[52] U.S. Cl. ......................... 364/900; 364/709
[58] Field of Search ............. 364/900, 709; 340/365 E

[56] References Cited

U.S. PATENT DOCUMENTS

| 4,021,656 | 5/1977 | Caudel et al. ............... 364/709 |
| 4,028,538 | 6/1977 | Olander, Jr. et al. ........ 364/709 |
| 4,064,399 | 12/1977 | Maranaka ................... 364/709 |
| 4,075,690 | 2/1978 | Shinoda et al. ............. 364/900 X |
| 4,139,864 | 2/1979 | Schulman ................... 364/709 X |
| 4,185,210 | 1/1980 | Zuk ......................... 340/365 E X |
| 4,267,578 | 5/1981 | Vetter ....................... 364/709 |

FOREIGN PATENT DOCUMENTS 5587139 7/1980 Japan .

Primary Examiner—David H. Malzahn
Attorney, Agent, or Firm—Jackson, Jones & Price

[57] ABSTRACT

In an instrument such as an electronic desk-top or pocket calculator, an exposure meter or the like, having a plurality of data-inputting switches in the form of a pushbutton switch, key switch, pressure or touch sensor switch, a control switch is provided for preventing inadvertent change of data stored or registered in the instrument. To this end, gates are interposed between the data inputting switches and a data storage member in the instrument. The instrument could alternatively include a microcomputer programmed to change its stored data in response to the operation of the input switches and to be prevented from changing the data upon operation of the control switch.

9 Claims, 3 Drawing Figures

KEY SWITCH INPUT CONTROL CIRCUIT

BACKGROUND OF THE INVENTION

1. Field of the Invention

The present invention relates to a safety device for data storage devices such as the registration section of an electric desk-top calculator with a built-in memory function or the data setting section of a light measuring meter or any other measuring instrument which includes a plurality of push-button switches, key switches, sensor switches or the like in such a section.

2. Description of the Prior Art

Recent measuring, calculating or controlling instruments such as electronic desk-top calculators and various measuring instruments, are often provided with push-button switches, key switches, sensor switches or the like for data inputs. With such switches, any desired data input and setting can be attained merely by pushing or touching them, resulting in facility of operation. Contrary to this advantage, they are also disadvantageous in that they are liable to be inadvertently operated, resulting in an inadvertent change of set or input data that must be maintained for a desired time period, thereby preventing a correct resultant value. This causes inconvenience and loss of productive time to the user of the device or instrument.

Japanese patent application Laid Open No. 55-87139 is of general interest in disclosing an underwater camera with a plurality of switches for data input and a water pressure responsive switch that is capable of disabling the data switches by grounding their terminals.

The prior art is accordingly seeking a relatively inexpensive approach to protecting data from inadvertent erroneous data input.

SUMMARY OF THE INVENTION

Accordingly, an object of the present invention is to provide a safety device for keeping set or input data from being inadvertently changed.

Another object of the present invention is to provide an improved safety device which includes a manually operable safety switch to inhibit any data changing signals from entering the data storage section.

A further object of the present invention is to provide a device which, in response to manual operation, disables the ability to change data stored in a calculator or measuring instrument.

A still further object of the present invention is to provide a safety device for avoiding undesired data changing and for use in electrical desk-top calculators, light measuring instruments and the like.

According to the present invention, a switch and a logic circuit responsive thereto are provided such that they prevent the entry of any signal from an input data operation section such as key switches, push-button switches, sensor switches or the like and prevent data entry in response to the operation of the switch. Thus, data-entering apparatus which incorporates the present invention, will have input keys for entering data and a storage capacity for storing the data for subsequent processing. The invention can include a binary counter for producing alternative pulses at a predetermined frequency on a pair of output terminals; at least a pair of switch members electrically connected, respectively, to the output terminals; a pair of gates, each electrically connected to a respective switch and a counter output terminal and operative upon closing of the switch to provide appropriate enabling signals to the input terminals of the gates; a processing circuit connected to the gates and activated by signals from the gates, and further connected to the storage members for storing an output of the processing circuit, and a control switch capable of blocking the operation of the gates, whereby data in storage cannot be altered.

Alternatively, a microcomputer can be programmed to poll a control switch and upon finding it has been activated, to thereby prevent any change in data stored in a register or in memory.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DETAILED DESCRIPTION OF THE PREFERRED EMBODMENT

The following description is provided to enable any person skilled in the field of electronics and microprocessors to make and use the present invention and sets forth the best mode contemplated by the inventors for carrying out their invention. Various modifications, however, will remain readily apparent to those skilled in the art, since the generic principles of the present invention have been defined herein specifically to provide a data-entering apparatus that can be manufactured in a relatively economical manner.

Figure 1:
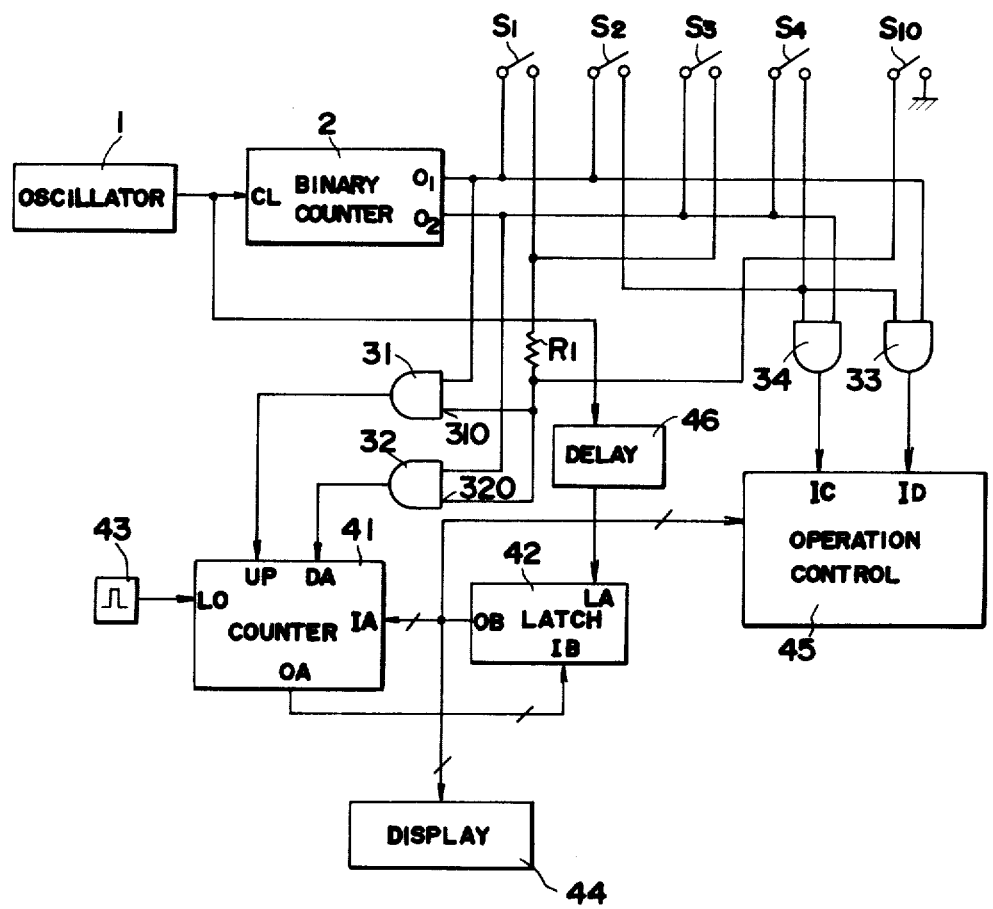
FIG. 1 is a circuit diagram showing a first embodiment of the present invention.

FIG. 1 discloses a circuit for a portable data-entering device with a plurality of push-button switches. A 2-bit binary counter 2 receives at input terminal CL successive pulses with a predetermined frequency supplied from an oscillator 1, and generates a pulse alternately at output terminals 01 and 02. The pulses from output terminals 01 and 02 are used as strobe signals for switches S1, S2, S3 and S4. As can be appreciated, the number of switches can be varied depending on the operative characteristics of the device.

Output terminal 01 is connected to one end of a normally open switch S1 which is interconnected with an up-button terminal of a counter for increasing a set value by a predetermined amount, as well as to one end of a normally open switch S2 which is interconnected with a start-button for starting an operation to be executed in execution control section 45. A display 44 can permit operator monitoring of the value entered by the counter.

Output terminal 02 is connected to one end of normally open switch S3 which is interconnected with a down-switch terminal of the counter for decreasing a set value by a predetermined amount, as well as to one end of a normally open switch S4 which is interconnected with a second start button for starting the operation to be executed in execution control section 45. The operation of processing of information to be initiated with switches S2 and S4 ON does not form a part of the present invention and a description thereof is omitted.

The other ends of switches S1 and S3 are connected to each other and are further connected through a resistor R1 to input terminals 310 and 320 of AND gates 31 and 32. Resistor R1 serves to protect output terminals 01 and 02 of 2-bit binary counter 2. Input terminals 310 and 320 of AND gates 31 and 32 are connected to one end of an ON/OFF switch S10 for controlling the capability of inputting data. The other end of ON/OFF switch S10 is grounded. ON/OFF switch S10 is normally turned OFF when data is being inputted by the keys. Another input terminal of AND gate 31 is connected to output terminal 01 of counter 2. With switch S1 ON, AND gate 31 generates a pulse equal to that from output terminal 01 of counter 2. Another input terminal of AND gate 32 is connected to output terminal 02 of counter 2. With switch S3 ON, AND gate 32 generates a pulse equal to that from output terminal 02 of counter 2. Additionally, the other ends of switches S2 and S4 are connected to each other and are also connected to the input terminals of AND gates 33 and 34. Another input terminal of AND gate 33 is connected to output terminal 01 of counter 2. With switch S2 ON, AND gate 33 generates a pulse equal to that from output terminal 01 of counter 2. Another input terminal of AND gate 34 is connected to output terminal 02 of counter 2. With switch S4 ON, AND gate 34 generates a pulse equal to that from output terminal 02 of counter 2. AND gates 31, 32, 33 and 34 serve to determine which one of switches S1, S2, S3 and S4 has been turned ON and to enable the appropriate terminal of the counter.

The output of AND gate 31 is connected to up-count input terminal UP of the UP/DOWN counter 41. The output of AND gate 32 is connected to down-count input terminal DN of UP/DOWN counter 41. Counter 41 receives at load terminal LO, a pulse from a monostable circuit 43 which generates a single pulse upon being energized from the power supply, and loads, from input terminal IA, the data set at latch 42. A slash on the line of FIG. 1 means that each line can actually consist of a plurality of lines. With switch S1 ON, a pulse is input from AND gate 31 to input terminal UP, and counter 41 counts up the data loaded from latch 42, according to the pulse input to input terminal UP. Furthermore, with switch S3 ON, counter 41 counts down the data according to the pulse from AND gate 32. Output terminal OA of counter 41 is connected to input terminal IB of latch 42.

A pulse from oscillator 1 is input through delay circuit 46 to latch terminal LA of latch 42. The data counted up or down by counter 41 according to the pulse input to latch terminal LA is held by latch 42. The data held by latch 42 is displayed by indicating section 44 and is also used for the operation to be executed by execution control section 45.

A predetermined amount of data is held in latch 42 upon power supply. Furthermore, latch 42 can be connected to a backup power supply, so that the set data will be maintained even if the power switch of the circuit is turned OFF.

As described above, the data in latch 42 is set by switches S1 and S3. If switch S1 or S3 is inadvertently depressed after a data setting, the data of latch 42 is counted up or down by counter 41, causing the data to be changed erroneously. In the present embodiment, switch S10 is turned OFF during data setting and turned ON after the data setting. With switch S10 turned ON, a low potential is supplied to input terminals 310 and 320 of AND gates 31 and 32, which then block the signals from output terminals 01 and 02 of counter 2, thereby generating a low potential. Therefore, even if switches S1 and S3 are turned ON inadvertently, no pulse is input to input terminals UP and DN of counter 41, whereby the data set in latch 42 is not changed, inadvertently.

The present embodiment has been described as having two switches, i.e., the up switch and down switch for setting data. The present invention can also be applied to the case where the data setting can be entered by a group of switches, such as 10 keys.

Figure 2:
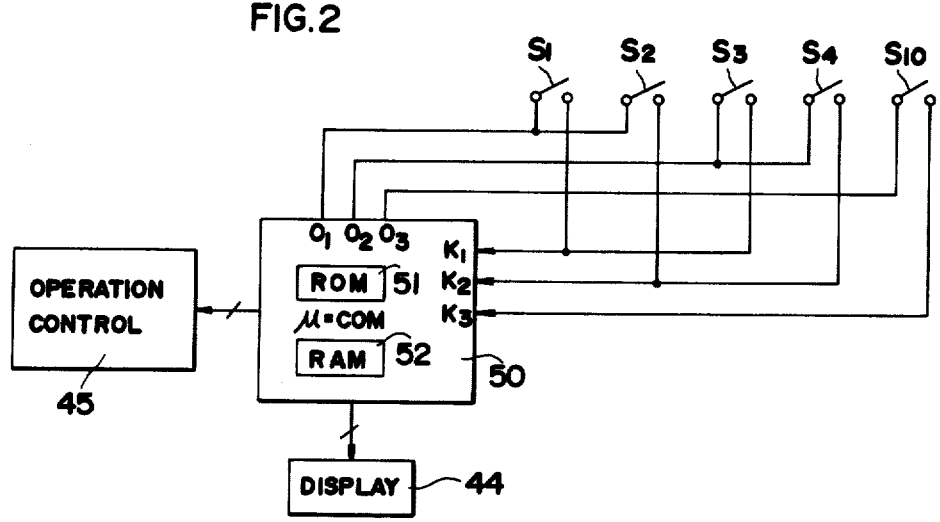
FIG. 2 is a block diagram illustrating a second embodiment of the present invention.

FIG. 2 shows a block diagram of a second embodiment of the present invention wherein a microcomputer (hereinafter referred to as μ-com) is used to control a circuit similar to that of the embodiment of FIG. 1.

The μ-com 50 includes a Random Access Memory 52 (hereinafter referred to as RAM 52) for holding data and a Read Only Memory 51 (referred to as ROM 51) for storing instructions. In addition, μ-com block 50 includes an accumulator and a system controller, which are standard, well known and which do not form any part of the present invention, so a description thereof is omitted.

The μ-com block 50 generates, from output terminals 01, 02 or 03, a strobe signal for switches S1, S2, S3, S4 and S10. The ON/OFF signals of switches S1, S2, S3, S4 and S10 are input to input terminals K1, K2 and K3 of μ-com block 50. The μ-com block 50 determines which one of switches S1, S2, S3, S4 and S10 is depressed, in dependence on the strobe signal from output terminals 01, 02 and 03 as well as the signal input to input terminals K1, K2 and K3, and μ-com block 50 operates according to that determination and the program is then stored in ROM 51. Switches S1 and S3 serve to set data, while switches S2 and S4 serve to perform any operation other than the data setting. Furthermore, switch S10 serves to control the data setting. The data set by switches S1 and S3 is stored in RAM 52 and is displayed by indicating section 44. The operation to be executed upon depression of switches S2 and S4, is carried out in execution control section 45.

Figure 3:
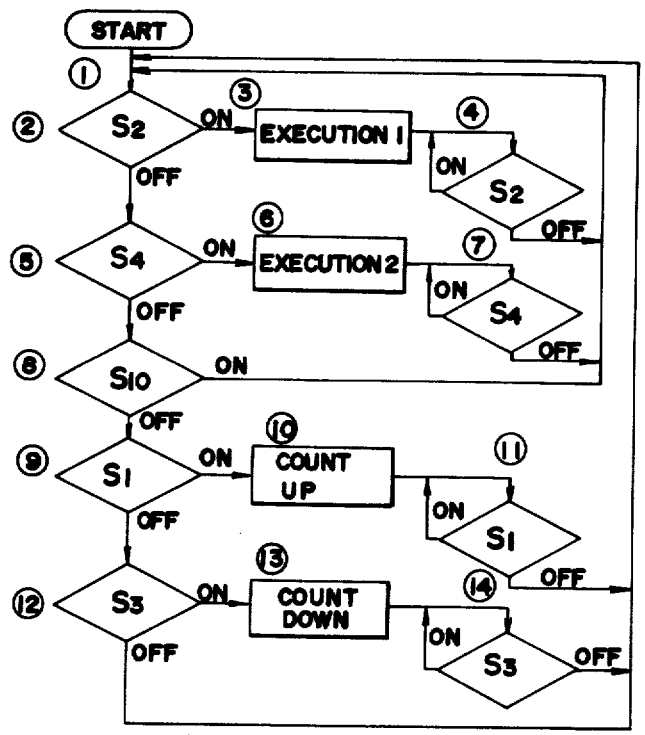
FIG. 3 is a flow chart for executing the embodiment of FIG. 2.

FIG. 3 is a flow chart of a program to be executed by μ-com block 50. With the power switch ON, μ-com block 50 starts execution at step 1 in the flow chart of FIG. 3. Next, μ-com block 50 determines at step 2 whether switch S2 is ON and then proceeds to step 3, if switch S2 is ON, to generate a signal to execution control section 45 so that execution 1 is carried out in response to switch S2. Upon completion of execution 1, μ-com block 50 proceeds to step 4 to determine whether switch S2 is OFF, and if so, return to step 1.

If switch S2 is not turned ON at step 2, μ-com block 50 goes to step 5 to determine whether switch S4 is ON. When switch S4 is ON, μ-com block 50 goes to step 6 and generates a signal to execution control section 45 so that execution 2 is carried out in response to switch S4. Upon completion of execution 2, μ-com block 50 proceeds to step 7 to determine whether switch S4 is OFF, and if so, returns to step 1.

If switch S4 is not turned ON at step 5, μ-com block goes to step 8 to determine whether switch S10 is ON. When switch S10 is ON, μ-com block 50 returns to step 1 to repeatedly determine whether switches S2 and S4 are ON.

If switch S10 is OFF at step 8, μ-com block 50 goes to step 9 to determine whether switch S1 is ON. When switch S1 is ON, μ-com block 50 proceeds to step 10 to count up the data stored in RAM 52, and after the counting, it determines whether switch S1 has been truned OFF at step 11, thereby returning to step 1.

If switch S1 is not turned ON at step 9, μ-com block 50 goes to step 12 to judge whether switch S3 is ON. When switch S3 is ON, μ-com block 50 goes to step 13 to count down the data stored in RAM 52. Determining whether switch S3 has been turned OFF afterwards, μ-com block 50 returns to step 1. When switch S3 is OFF at step 12, μ-com block 50 returns to step 1 to repeat the above operation.

When μ-com block 50 operates according to the flow chart, turning switches S1 and S3 ON with switch S10 OFF allows the data stored in RAM 52 to be changed. Furthermore, with switch S10 ON, steps 9 through 14 are not executed, whereby the data stored in RAM 52 is not changed even when switches S1 and S3 are turned ON.

While the above embodiments have been disclosed as the best modes presently contemplated by the inventors, it should be realized that these examples should not be interpreted as limiting, because artisans skilled in this field, once given the present teachings, can vary from these specific embodiments. Accordingly, the scope of the present invention should be determined solely from the following claims.

What is claimed is:

1. An instrument comprising:
a plurality of manually operable input switches;
means connected to said input switches for generating a signal in response to manual operation of one of said switches;
a data storing means for storing data;
a data changing means connected to said data storing means for changing said data in response to said signal;
a gate means interposed between said means for generating and said data changing means for selectively passing said signal;
a control switch connected to said gate means and manually operable for selectively blocking and unblocking said gate means such that said data stored in said data storing means can be changed with said gate means unblocked and cannot be changed with said gate means blocked;
an execution means connected to said data storing means for executing predetermined operations based on said data in said data storing means irrespectively of the state of said control switch; and
an initiation switch connected to said execution means and manually operable for initiating the operation of said execution means.

2. The instrument of claim 1 further comprising display means, connected to said data storing means, for indicating the data stored in said data storing means.

3. The instrument of claim 1 wherein said data changing means includes a counter means for counting said signals passed through said gate means, said counter being coupled with said data storing means to supply the latter with the data signals counted thereby.

4. The instrument of claim 3 wherein the input switches include an up key switch and a down key switch and said counter means includes an up-down counter which respectively counts up the data signals with said up key switch operated and counts down the data signals with said down key switch operated.

5. An instrument comprising:
a plurality of manually operable input switches;
a data storing means for storing data;
a control switch manually operable for selectively outputting a signal for permitting said data in said data storing means to change and a signal for inhibiting said data in said data storing means from changing;
an initiating switch manually operable for initiating a predetermined operation based on said data in said data storing means; and
a processing means connected to said input switches, said control switch, said initiating switch and said data storing means including means for respectively detecting the operation of said input switches, said control switch, and said initiating switch, means for changing the data in said data storing means in response to the detection of the operation of said input switches, means for selectively permitting and inhibiting the change of said data by said means for changing in response to the detection of the operation of said control switch and means for initiating the predetermined operation in response to the detection of the operation of said initiating switch irrespectively of the state of said control switch.

6. The instrument of claim 5 wherein said processing means includes a microcomputer.

7. A data entering apparatus comprising:
a pulse generator for generating alternative pulses at a predetermined frequency on a pair of output terminals thereof;
a pair of input switches respectively connected to the output terminals of said pulse generator;
a pair of gates, each of which has an input terminal connected to one of said input switches and operative upon closure of said input switch coupled thereto to pass the pulse generated from said pulse generator;
an up-down counter which counts up or down for selectively counting the pulses, and generating a data signal counted thereby, said counter having an up terminal and a down terminal connected to respective output terminals of said gates;
a data storing means having an input terminal thereof being connected to an output terminal of said up-down counter, for storing the data signals; and
a control switch connected to said gates and capable of blocking the operation of said gates such that data in said data storing means cannot be altered.

8. The apparatus of claim 7 wherein said control switch has a pair of terminals and further comprising a resistor with two terminals, one terminal thereof being connected to each of said input terminals of said gates and to one terminal of said control switch, the other terminal of said control switch being connected to ground, and the other terminal of said resistor being connected to said input switches.

9. The apparatus of claim 8 including display means connected to said data storing means for indicating the data stored in said data storing means.

* * * * *